(12) United States Patent
Kiridena et al.

(10) Patent No.: US 6,429,789 B1
(45) Date of Patent: *Aug. 6, 2002

(54) VEHICLE INFORMATION ACQUISITION AND DISPLAY ASSEMBLY

(75) Inventors: Vijitha Senaka Kiridena; Gregory Hugh Smith, both of Ann Arbor, MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/370,144

(22) Filed: Aug. 9, 1999

(51) Int. Cl.[7] ................................. G08G 1/09
(52) U.S. Cl. ...................... 340/905; 340/936; 340/937; 340/988; 340/942; 340/943; 701/301; 701/117; 701/207
(58) Field of Search ................. 340/936, 937, 340/943, 435, 436, 942, 905, 988, 990, 995, 901, 903, 904, 902; 701/301, 117, 207, 208, 211, 213; 382/104, 107; 359/155; 348/169, 143, 148, 149

(56) References Cited

U.S. PATENT DOCUMENTS

| 3,932,861 | A |   | 1/1976  | Bull |
|-----------|---|---|---------|------|
| 4,182,053 | A |   | 1/1980  | Allen et al. |
| 4,868,652 | A |   | 9/1989  | Nutton |
| 5,051,735 | A |   | 9/1991  | Furukawa |
| 5,296,854 | A |   | 3/1994  | Hamilton et al. |
| 5,396,429 | A |   | 3/1995  | Hanchett |
| 5,414,439 | A |   | 5/1995  | Groves et al. |
| 5,414,461 | A |   | 5/1995  | Kishi et al. |
| 5,465,142 | A |   | 11/1995 | Krumes et al. |
| 5,519,410 | A |   | 5/1996  | Smalanskas et al. |
| 5,519,536 | A |   | 5/1996  | Hoehn |
| 5,661,454 | A |   | 8/1997  | Bezard et al. |
| 5,666,227 | A |   | 9/1997  | Ben-Ghiath |
| 5,680,312 | A | * | 10/1997 | Oshizawa ................. 364/444.2 |
| 5,745,870 | A | * | 4/1998  | Yamamoto et al. ......... 340/436 |
| 5,801,943 | A | * | 9/1998  | Nasburg ...................... 340/910 |
| 5,825,306 | A | * | 10/1998 | Hiyokawa ................... 340/988 |
| 5,845,000 | A |   | 12/1998 | Breed et al. |
| 5,907,293 | A | * | 5/1999  | Tognazzini ................. 340/436 |
| 5,914,652 | A | * | 6/1999  | Adamo ........................ 340/436 |
| 5,926,112 | A | * | 7/1999  | Hartzell ...................... 340/902 |
| 5,978,737 | A | * | 11/1999 | Pawlowski et al. ......... 340/436 |

* cited by examiner

*Primary Examiner*—Jeffery Hofsass
*Assistant Examiner*—Daniel Previl

(57) ABSTRACT

A vehicle information acquisition and display assembly 10. The system 10 selectively senses objects 27 residing within a dynamically configurable region of interest 29 and compares values which are created by use of these sensed objects 27 with at least one criteria value. Based upon this comparison, icons are selectively displayed to a driver 15 of a vehicle 11 which represent the sensed objects 27.

20 Claims, 6 Drawing Sheets

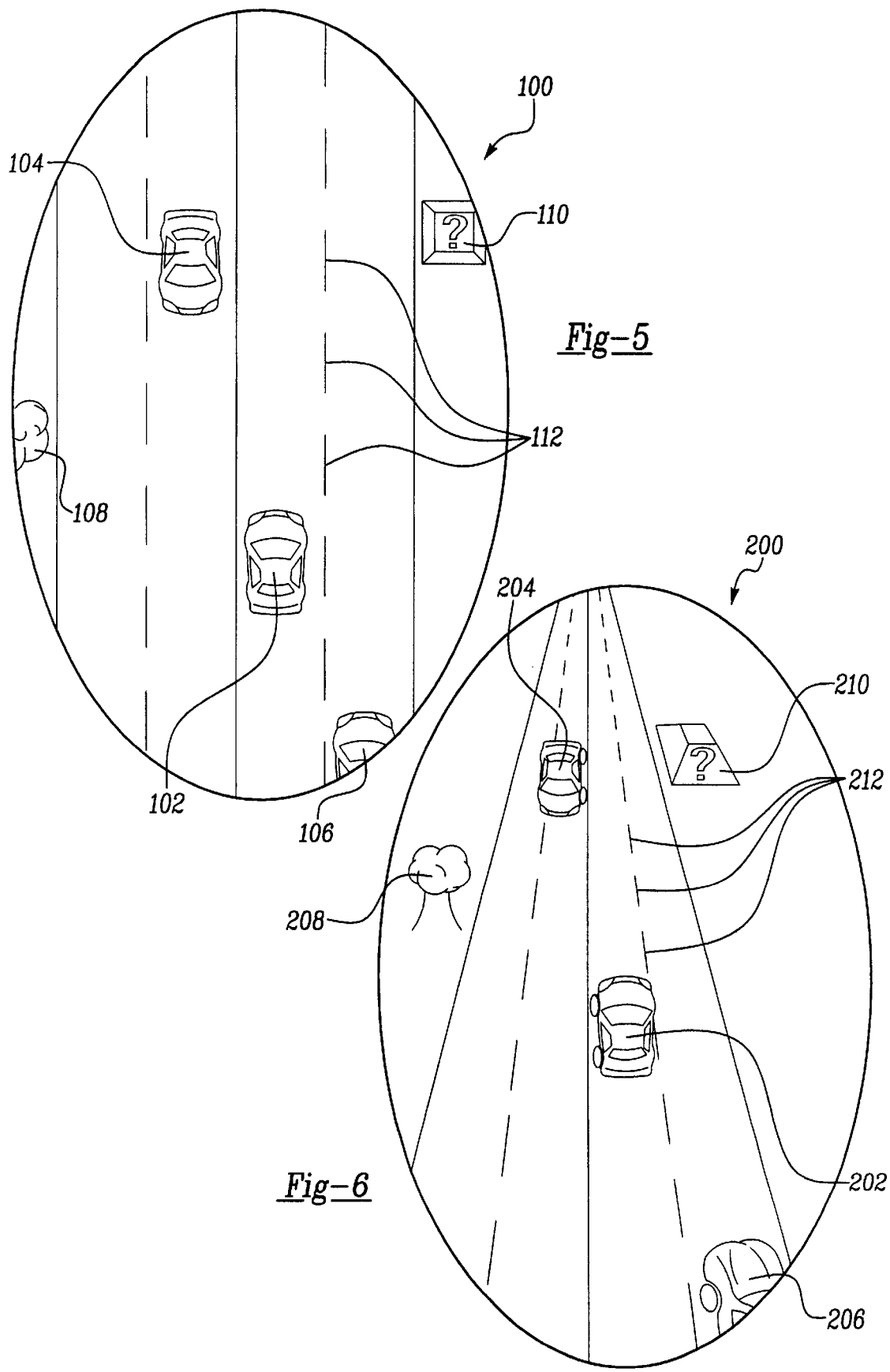

VEHICLE INFORMATION ACQUISITION AND DISPLAY ASSEMBLY

FIELD OF THE INVENTION

This invention relates to a vehicle information acquisition and display assembly and more particularly to an assembly for use within a vehicle, which is adapted to selectively and automatically create and/or define a "region of interest", and which is further adapted to selectively acquire and display information relating to and/or representing certain objects located within the created and/or defined "region of interest".

BACKGROUND OF THE INVENTION

It is desirable to provide a driver of a vehicle with some information associated with, representing, and/or describing a portion of the area surrounding the vehicle or the "environment" in which the vehicle is disposed within, thereby identifying potential threats, objects, and/or hazards to the driver and significantly improving the driver's ability to avoid an accident or other misfortune.

Some efforts have been previously made to improve the driver's awareness or knowledge of the vehicle's environment. Particularly, these prior efforts include providing and selectively installing "vision aiding devices" such as mirrors, lights, or windows upon the vehicle, in order to improve the driver's range of vision. These devices and/or assemblies provide the driver with information concerning only a rather limited portion of the vehicle environment and often include a number of undesirable "blind spots" or areas for which no information or image is provided.

Another prior method or technique of increasing the driver's awareness or knowledge of the area proximate to the vehicle (or of the vehicle's environment) requires the installation of a number of sensors upon and/or within the vehicle. Particularly, these selectively installed sensors provide certain information to the driver and warn the driver if the vehicle is close to contacting an object (e.g., if the vehicle is about to "back into" the object).

The reduction in the overall cost of these sensors has allowed and/or has motivated vehicle manufacturers to use these sensors more extensively within and/or upon their respectively produced vehicles. Examples of such sensors include radar, laser, ultrasound, and/or infrared sensors and/or a conventional and commercially available camera. While the increased use of these sensors has indeed allowed the driver to gain a more complete view of some portion of or all of the area immediately and/or proximately surrounding the vehicle, such use has also undesirably increased the danger or the probability of the driver becoming undesirably "overloaded" with the provided information.

Particularly, the relatively large number of sensors used in certain vehicles often and undesirably "bombards" and/or confuses the driver with an overabundance of substantially "real-time" information, including much information that has little or no relevance or importance to the driver (e.g., images of stationary objects which are remotely located from the vehicle). This driver "information overload" decreases the ability of the driver to discern information which is truly useful to the driver or which describes potential or imminent hazards; the truly relevant or important information being "lost" or obscured by all of the other data or information which is substantially and simultaneously presented to the driver. This driver "information overload" also increases the probability of a collision due to the great amount of time needed by the driver to decipher or review all of the provided information, thereby substantially preventing or hindering the driver from attending to and/or concentrating "on the road" and on the task of safely maneuvering the vehicle.

These prior techniques and/or assemblies also are generally "static". That is, the monitored portion of the vehicle environment or area proximately surrounding the vehicle is typically "fixed" and static, and not readily susceptible to change or modification. Hence, these prior techniques and/or assemblies were not and are not "dynamically configurable", in that their respective monitored area or portion of the vehicle environment is not and was not automatically and/or dynamically modified to suit the ever-changing needs of the driver, based upon certain driving conditions and/or vehicle attributes. For example, a driver controlling a vehicle which is travelling upon a highway at a speed of 70 miles per hour has different informational needs than the driver does when turning the vehicle at about 10 miles per hour. Hence, these prior techniques and/or assemblies were not very useful in many instances.

There is therefore a need for a vehicle information system which acquires and provides sufficient information related to the vehicle's environment to adequately assist the driver to avoid a collision without "overloading" the driver with extraneous, non-relevant and/or "non-helpful" types of information. There is a further need for a vehicle information system which selectively creates a dynamically configurable monitored area which provides relevant information to the driver concerning and/or representing objects residing within this dynamically configurable area.

SUMMARY OF THE INVENTION

It is a first object of the invention to provide a vehicle information assembly which overcomes many, if not all, of the previously delineated drawbacks of such prior systems, devices, techniques, and/or methods.

It is a second object of the invention to provide a vehicle information assembly for use with a vehicle and which is adapted to create a dynamically configurable "region of interest", to acquire information associated with and/or describing objects which reside within the created "region of interest", and which selectively displays some of the acquired information which the system considers to be relevant and useful to the vehicle driver.

It is a third object of the invention to provide a vehicle information assembly which is adapted to acquire information describing the environment within which the vehicle resides, which "pre-screens" or "filters" this acquired information by use of certain "relevance criteria" and which selectively creates icons and/or symbols which are selectively displayed to the driver by use of the certain "relevance criteria".

It is a fourth object of the intention to provide a vehicle information assembly for use by a driver of a vehicle and which selectively presents relevant information regarding and/or relating to the area surrounding the vehicle in a substantially clear and substantially unambiguous graphical form.

According to a first aspect of the invention, a vehicle display assembly for use within a vehicle is provided. The vehicle is selectively driven in proximity to at least one object. The display assembly includes at least one sensor which senses the at least one object and which provides an output signal having a certain value; and a processor which is coupled to the at least one sensor, which contains at least one object criteria value, which receives the output signal, and which compares the certain value of the output signal to the at least one object criteria value and, based upon the comparison, which selectively generates and displays at least one icon representing the at least one object.

According to a second aspect of the invention, a method of displaying information related to an object located in proximity to a vehicle is provided. The vehicle is selectively travelling at a certain speed and at a certain direction. The method includes the steps of providing at least one sensor which measures the speed and direction of the vehicle; providing a controller for selectively creating a "region of interest" around the vehicle based upon the measured speed and the direction of the vehicle; providing at least one sensor for measuring the location of the object and for measuring the size of the object; determining whether the object resides within the "region of interest"; providing an icon; and displaying the icon only if the object resides within the "region of interest".

Further objects, features, and advantages of the present invention will become apparent from the following detailed description of the preferred embodiment of the invention and by reference to the following drawings.

BRIEF DESCRIPTION OF THE DRAWINGS

For a fuller and more complete understanding of the nature and the objects of the present invention, reference should now be had to the accompanying drawings. It should be apparent to those of ordinary skill in the art that the accompanying drawings are included for the purpose of clarifying Applicants' invention and are not intended, nor should they be construed, as limiting Applicants' invention in any manner whatsoever.

Particularly, the following drawings delineate, in a non-limiting manner, the following aspects of Applicants' invention:

FIG. 5 illustrates one example of a user interface or a display screen which is used by the vehicle information assembly which is shown in FIG. 1 and further illustrating the selective display of data in a "top view" type of informational display format;

FIG. 6 illustrates a second example of a user interface or a screen which is used by the vehicle information assembly which is shown in FIG. 1 and further illustrating the selective display of data in a "perspective view format" type of informational display format;

DETAILED DESCRIPTION OF THE PREFERRED EMBODIMENT

Figure 1:
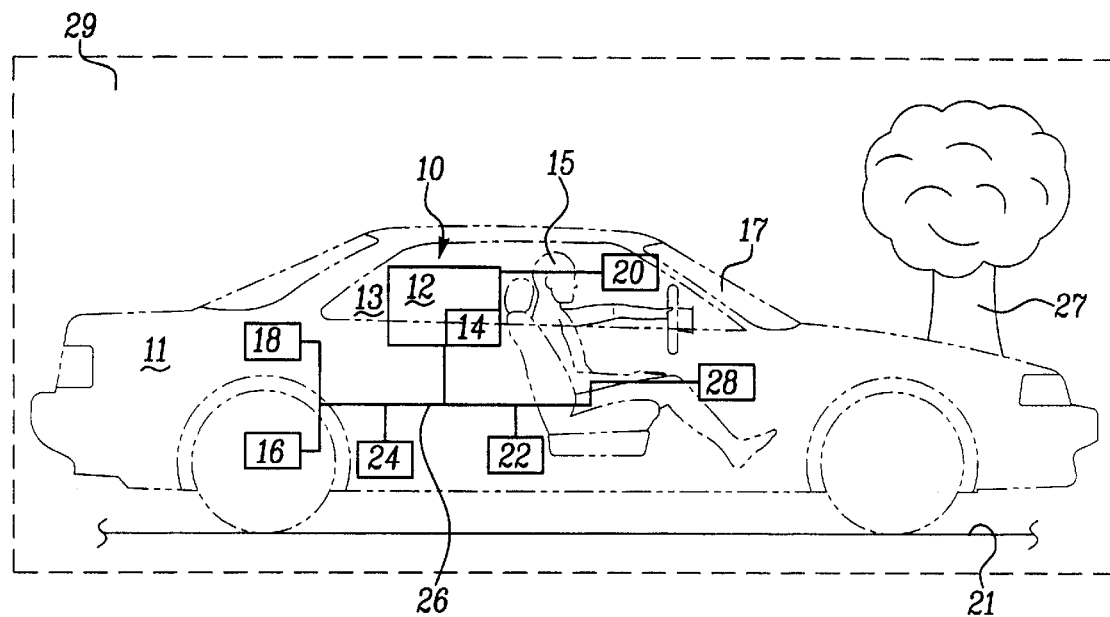
FIG. 1 is a block diagram of a vehicle information assembly which is selectively deployed within a conventional vehicle and which is made in accordance with the teachings of the preferred embodiment of the invention.

Referring now to FIG. 1, there is shown an information acquisition and display assembly 10 for use within a vehicle 11 and made in accordance with the teachings of the preferred embodiment of the invention. As shown, system or assembly 10 includes a conventional and commercially available microprocessor, micro-controller or controller 12 having a memory portion 14 and operating under stored program control. More particularly, controller 12 is electrically, physically, and communicatively coupled to "vehicle attribute" sensors 16, "surrounding area" or "environmental" data/information acquisition sensors 18, a receiver 24, and a user input device 28, by use of at least one communications bus or path 26. Controller 12 is electrically, physically, and communicatively coupled to a user interface device or display 20 by communication bus or path 15. Controller 12 and display 20 are further physically and electrically coupled to a supply of electrical voltage 22, such as a vehicle battery, which selectively provides electrical power to assembly 10.

In the preferred embodiment of the invention, memory portion 14 comprises a conventional and commercially available memory "unit" or memory assembly, including both permanent and temporary "address selectable" memory sections, and being adapted to selectively store and/or contain at least a portion of the operating software program which directs the operation of processor 12 and assembly 10. Moreover, memory 14 is also adapted to selectively store other types of data or information, including but not limited to, historical operating and processing data. More particularly, examples of such data include, but are not limited to, data defining or selectively "fixing" the current "region of interest" proximate to the vehicle 11 (the "region of interest" as explained below, is defined as the portion of the vehicle environment which is currently and/or which is to be monitored by the deployed assembly 10) and data relating to the identification of and/or relevance of certain objects which reside within the current or perhaps one of the previously defined "regions of interest". Moreover, as should also be apparent to those of ordinary skill in the art, controller 12 and memory 14 may comprise several commercially available, conventional, and selectively programmable and/or selectively arrayed "chips" or devices which are operatively and communicatively linked in a cooperative manner.

"Vehicle attribute" sensors 16 comprise conventional and commercially available sensors which measure and/or selectively acquire certain information associated with the vehicle 11. For example and without limitation, these sensors 16 measure and/or sense such vehicle attributes/characteristics as the vehicle speed, the engine speed, the current direction of vehicle travel, the steering angle, throttle position, turn signal light illumination, and/or the roll, pitch and/or yaw type movements of selected portions and/or components of the vehicle 11. Sensors 16 cooperatively provide this selectively measured and/or sensed vehicle attribute data or information to controller 12 by use of communications bus or path 26.

"Surrounding area" or "environmental" sensors 18 comprise conventional and commercially available sensors which are selectively disposed within, upon, and/or around the vehicle 11 and which cooperatively measure and/or acquire certain information pertaining to certain "areas" or locations which are external to and/or which form a portion of the environment that the vehicle 11 resides within. Such acquired information includes but is not limited to the location and certain attributes/characteristics of objects, such as object 27, which is proximately located to the vehicle 11 and which is resident within a certain "region of interest" or within a certain predefined area 29. Each of these deployed sensors has an operative range (e.g., a maximum distance from its respective deployed position upon vehicle 11 that it "senses" objects within). Each of these ranges (respective monitored distance from the vehicle 11), and the respective angle (e.g., the monitored "width" and the "height" of each respective sensor) in the preferred embodiment of the invention, are "modifiable" or selectively programmable by the controller 12. In the preferred embodiment of the invention, each of the sensors 18 are positioned upon vehicle 12 in a manner which allows the sensors 18 to cooperatively provide information regarding the surrounding area of vehicle 11 (e.g., in one non-limiting embodiment, controller 12 modifies the range and the angle of certain sensors 18 and selectively uses and/or interrogates only these certain sensors, thereby forming a "region of interest" which is defined in this non-limiting example, by the totality of the monitored areas which the interrogated sensors 18 are capable of and are currently programmed to sense objects within).

Figure 2:
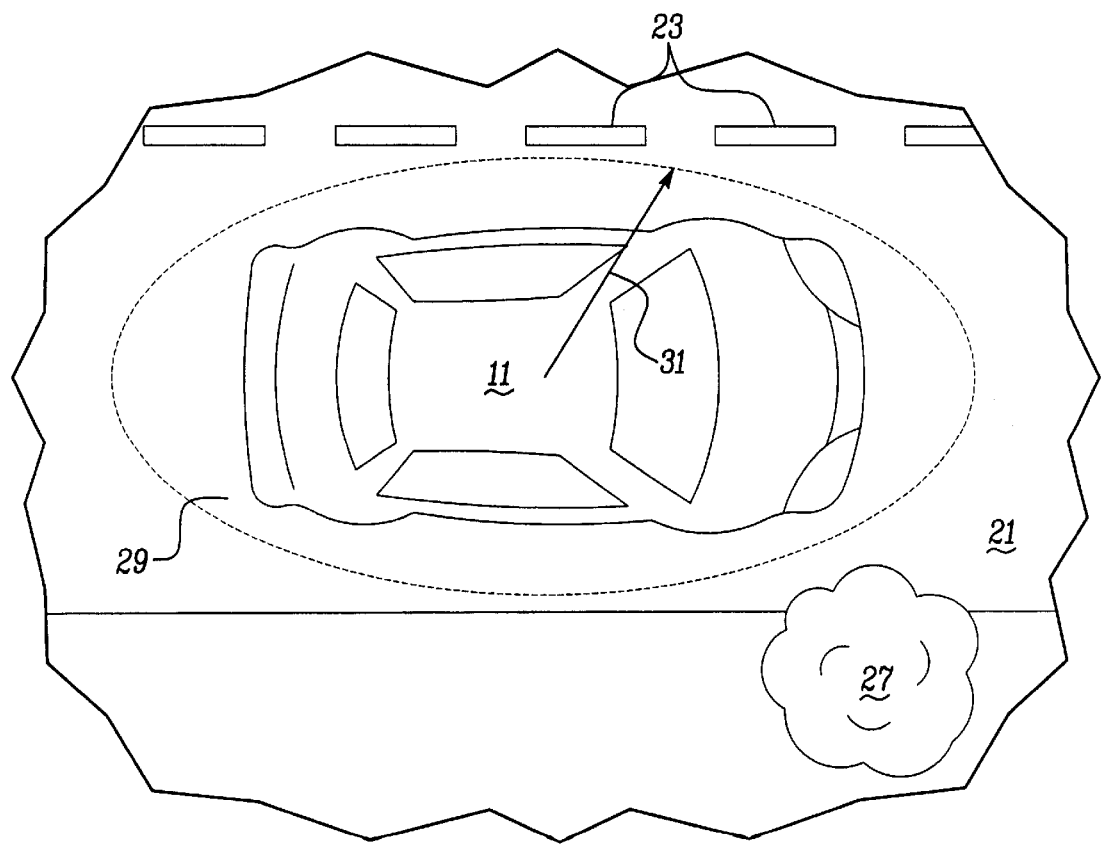
FIG. 2 is a top view of the vehicle which is shown in FIG. 1.

For example and without limitation, sensors 18 may include one or more conventional and commercially available radar, laser, ultrasound, acoustical, video, and/or infrared sensors which selectively measure and/or acquire information such as the location, size, shape, speed, range, and direction of travel of objects (e.g., such as object 27) located within a certain distance of the vehicle and/or within a certain predefined "region of interest" 29, as illustrated in FIGS. 1 and 2. Examples of such objects include, but are not limited to, other vehicles, barriers, walls, trees, rocks, pedestrians, animals, and street lights. These sensors 18 also cooperatively measure the direction and condition of the road 21 upon which the vehicle 11 traverses (e.g., the path and width of the road 21, lane markers 23, or the existence of potholes, ice, water or snow upon the road). Sensors 18 may also selectively include conventional temperature, moisture, and light sensors for respectively determining the temperature and/or weather conditions outside of the vehicle 11 (e.g., rain, snow, sleet), as well as the amount of visible light outside the vehicle 11 (e.g., whether the vehicle 11 is being currently driven during the day or the night). It should be appreciated that sensors 18 may include and/or be capable of providing one or more sensing functions, thereby individually measuring a plurality of object characteristics, such as the size, range and velocity of an object 27.

Display 20 comprises a conventional and commercially available electronic output display device, such as and without limitation a flat panel display, a liquid crystal display, a laser or holographic or "heads up" type, a video display, or virtually any other type of computer image type display which is suitable to display electronic and/or computerized output data or information which selectively emanates from and/or is generated by assembly 10 (e.g., by and/or from processor 12 and/or from memory 14).

Display 20 is preferably mounted within the passenger compartment 13 of the vehicle 11 in a position which allows the driver 15 to easily view the display 20, such as on or within the vehicle instrument panel. In an alternate embodiment of the invention, display 20 comprises a laser or holographic type display, and this display is projected directly onto the windshield 17 or within the driver's field of view. In this manner, the driver 15 is not required to substantially turn or articulate his or her "line of vision" substantially away from the road 21 to view the display.

Receiver 24 comprises a conventional and commercially available telecommunications device or assembly which is adapted to selectively receive electromagnetic signals and to communicate at least some of the received signals to controller 12 by the use of communications bus 26. In one embodiment of the invention, receiver 24 is adapted to selectively receive electromagnetic signals from conventional roadside sensors, traffic information broadcast assemblies/devices, and transmissions from a conventional and orbiting satellite (not shown).

User input device 28 comprises a conventional and commercially available input device such as and without limitation a series of selectively depressible "push buttons", a keyboard, a "touch pad", a microphone and/or virtually any other conventional and commercially available device which is suitable to selectively permit a user (typically the driver 15) or passenger of the vehicle 11, to selectively "enter" and/or to communicate data and/or commands into processor 12 and/or memory array 14. In one non-limiting embodiment of the invention, driver 15 may selectively "program" or create the "region of interest" 29 by use of device 28.

Figure 3:
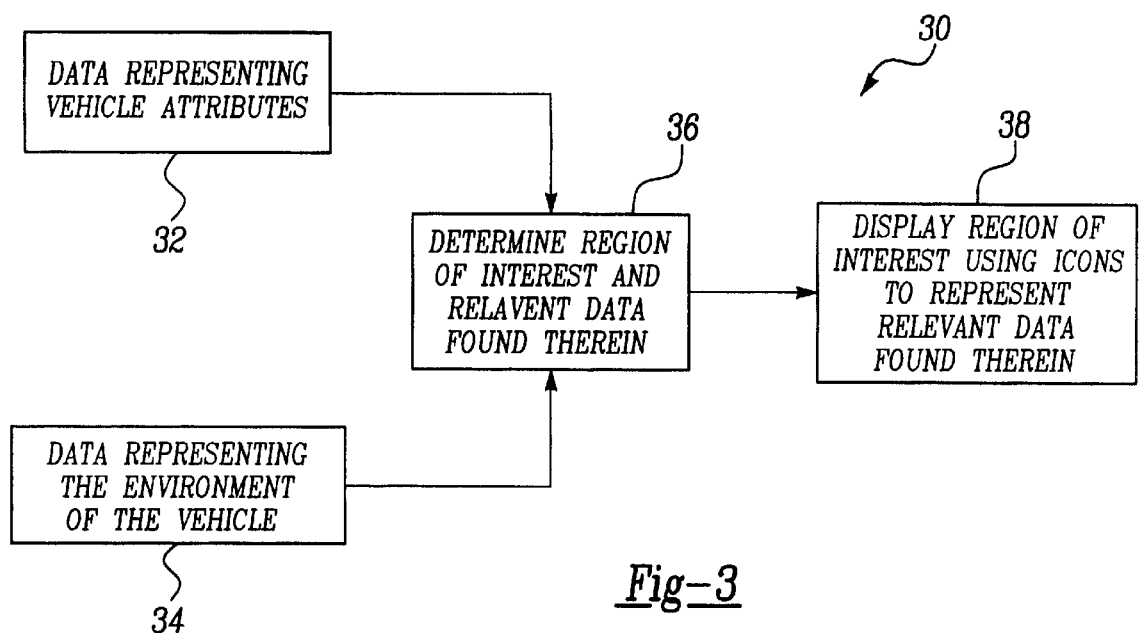
FIG. 3 is a block diagram illustrating certain broad functional aspects of the vehicle information assembly which is shown in FIG. 1.

To understand the general operation of vehicle information assembly 10, reference is now made to flow chart 30 of FIG. 3, which illustrates and/or represents a broad functional overview of assembly 10. As shown, "vehicle attribute data" 32 is selectively and cooperatively detected, acquired, and/or measured by sensors 16. Particularly, in the preferred embodiment of the invention, data 32 describes the present attributes and/or characteristics of the vehicle 11, such as the speed of the vehicle 11, the direction of travel of the vehicle 11, the rate with which the vehicle 11 is presently "turning", and/or the rate with which the vehicle 11 is changing or altering its direction. The data 32 is acquired by and communicated from sensors 16 to controller 12 by use of communications bus 26. The communicated data 32 is processed and selectively used by controller 12, in one non-limiting embodiment, to determine and/or to dynamically configure a relevant area or a "region of interest" 29.

Data 34 represents "surrounding area" or environment data which is cooperatively acquired, detected, and/or measured by the sensors 18. Particularly, in this embodiment, data 34 represents and/or comprises the identity and certain characteristics of objects 27 located within the environment of the vehicle 11. Data 34 is communicated from sensors 18 to controller 12 by use of communications bus 26 (or other communication mediums), and controller 12 processes the data 34 along with the received data 32 in order to determine which of the identified or "sensed" objects 27 will be displayed to the driver 15 (e.g., only objects 27 which meet certain "relevance criteria" will be displayed) and what display type attributes should be given to those objects 27.

As shown by functional block 36 and 38, assembly 10 selectively displays (upon display 20) certain information and/or symbols associated with the objects 27 which are located within the "region of interest" and which are deemed to be "relevant". As more fully explained below, all of the selected and relevant objects 27 are displayed by the use of representative symbols or icons in order to reduce the amount of extraneous information which is presented to the driver 15 and to concomitantly reduce the time and the amount of cognitive attention required by the driver 15 to interpret the displayed information.

The displayed icons are also dynamically modified by assembly 10 in accordance with the changing nature of the sensed or measured attributes of these objects 27 and in accordance with changes in the respectively measured spatial relationships between these objects 27 and the vehicle 11. For example and without limitation, in the preferred embodiment of the invention, the shape of the sensed and selected object 27 will determine the type of object representative icon which is selectively displayed to the driver 15. The relative size and/or range of the sensed and selected object 27 will determine the overall size of the presented icon. The range of the object 27 (e.g., the current distance that object 27 resides from vehicle 11) will determine the location which the icon is placed upon display 12 as well as the size of the produced icon (e.g., the icon will be smaller if the object is relatively "far" from the vehicle and will be larger if the object is relatively "close" to the vehicle 11). Selected "special attributes" of the sensed and selected object 27 (e.g., stationary positioned objects, relatively high velocity objects, erratically travelling objects, and/or objects having a collision potential with vehicle 11) will have icons of a certain color or having other display type attributes (e.g., a certain flashing or a high intensity of the displayed color will denote these "special characteristics").

Figure 4:
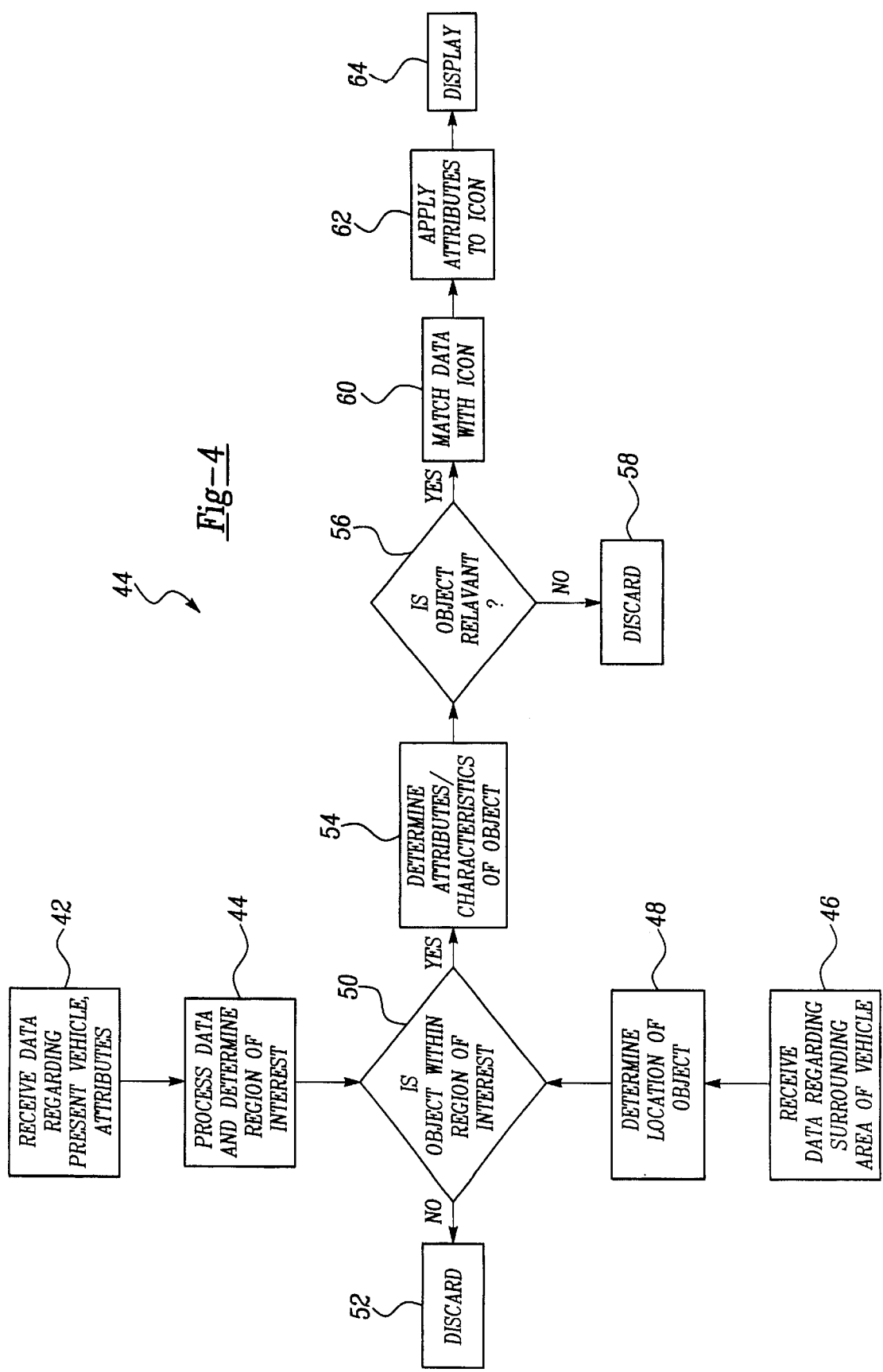
FIG. 4 is a block diagram illustrating certain detailed functional aspects of the vehicle information assembly which is shown in FIG. 1.

To more fully understand the operational functionality of the preferred embodiment of assembly 10, reference is now made to the more detailed operational flow diagram or "flow chart" 40 of FIG. 4. As shown in step 42 of flow diagram 40, assembly 10 receives "vehicle attribute" data 32 which is communicated to controller 12 from sensors 16 by use of the communications bus 26 or another communications medium. Step 44 follows step 42, and in this step 44, controller 12 processes the received data 32 and, based upon this data, determines and/or "dynamically configures" a relevant area or "region of interest" 29 which is proximate to the vehicle 11. Specifically, in the preferred embodiment of the invention, controller 12 uses the sensed and/or measured speed of the vehicle 11 (e.g., the speedometer sensor data), the direction of travel of the vehicle 11 (e.g., forward or reverse), and the rate of change of the direction of travel of the vehicle 11 (e.g., steering wheel sensor, accelerometer, and/or processed vision data) to determine and/or to dynamically and automatically create and configure the "region of interest" 29 without intervention on the part of the driver 15 or any of the other vehicle occupants.

For example and without limitation, if the vehicle 11 is traveling at a relatively high speed, controller 12 will dynamically and automatically, without intervention of the driver 15 or other vehicle occupants, extend the "region of interest" 29 further in the direction of travel of the vehicle (e.g., approximately 100 meters in front of the vehicle 11). If the vehicle 11 is traveling at a very slow speed or is parking, the created and/or defined "region of interest" 29 will extend only a relatively small distance around the vehicle 11 (e.g., several meters). While the vehicle 11 is in reverse, the "region of interest" 29 will extend primarily behind the vehicle 11. If the vehicle 11 is turning, the "region of interest" 29 will be extended in the direction of the vehicle turn. Controller 12 dynamically, continually, and automatically adjusts or recalculates the "region of interest" in substantially and/or approximate "real time" based upon the vehicle's speed, direction and steering sensor inputs and/or in accordance with other measured vehicle attributes. In an alternate non-limiting embodiment, controller 12 recalculates the "region of interest" once every ten seconds or once every other programmable and selectively determined period of time which may be dissimilar to the foregoing ten second or "real time" embodiments.

The "region of interest" 29 is generally circular or elliptical, being defined as the totality of the currently configured operative ranges and, in another non-limiting embodiment, the totality of operative angles of the deployed environmental sensors 18, and having a monitored area or volume which varies as a function of the vehicle's speed and direction. For example, in one non-limiting embodiment, controller 12 and sensors 18 cooperatively create a generally circular "region of interest" 29 around the vehicle 11 having a radius 31 of a predetermined length based upon the speed of the vehicle (e.g., 25 meters). In a non-limiting embodiment, "region of interest" 29 may have a certain volume (e.g., the monitored area may have a monitored height component).

As the vehicle's speed increases, the controller 12 increases the radius 31 of the "region of interest" 29 only in the general direction of travel of the vehicle 11 and by an amount which is proportional to the increase of speed of the vehicle 11 (e.g., if the vehicle 11 is traveling twice as fast, the radius 31 of the "region of interest" 29 in front of the vehicle 11 will increase to 100 meters or twice as far as it was before the increase in speed occurred). In other non-limiting embodiments, the determination or definition of the "region of interest" 29 is further modified by certain of the sensors 18, such as those of sensors 18 which measure or detect "cross-roads" or intersections within the path of travel of the vehicle 11 and environmental conditions. For example, in such other non-limiting embodiments, in the presence of an intersection, the "region of interest" 29 is extended further in the directions of the intersecting roadways, and in the presence of icy or wet conditions, the "region of interest" 29 is extended further in the vehicle's direction of travel. In other non-limiting embodiments, the "region of interest" 29 is of a predetermined configuration based upon certain vehicle attributes (e.g., vehicle speed)and upon sensing these attribute values, controller 12 creates the associated and predetermined "region of interest" 29.

While receiving vehicle attribute data 32, as shown in step 42, assembly 10 concurrently receives data 34, which comprises environment or "surrounding area" data which is acquired, detected and/or measured by the sensors 18 and communicated to processor or controller 12, as shown in step 46. In one non-limiting embodiment of the invention, the sensors 18 are substantially always "activated" or made to acquire data at substantially the same interval of time in order to adequately warn driver 15 of impending danger (e.g., even though, in one non-limiting example, the "region of interest" 29 extends in the front of vehicle 11, the sensors 18 which detect objects in the rear of the vehicle 11 are still activated and are capable of interrupting controller 12 with a warning signal identifying a relatively high speed object which may impact the rear of the vehicle 11). The number and type of sensors 18 which are activated and used to create a "region of interest" 29 and to measure and/or acquire data 34 varies according to the current operating mode, environmental conditions and speed of the vehicle 11. For example, when the vehicle 11 is in a "reverse directional type of operating mode", controller 12 automatically and dynamically interrogates primarily those sensors 18 which are disposed in the rear of the vehicle 11 or which sense objects located behind the vehicle 11. When the vehicle 11 is being parked, controller 12 automatically and dynamically interrogates primarily only those of sensors 18 which are relatively "short-range" sensors (e.g., infrared and video sensors), and when the vehicle 11 is on the highway or traveling at a relatively high rate of speed, controller 12 primarily, automatically, and dynamically interrogates those sensors 18 which are relatively "long-range" sensors (e.g., radar, laser, and ultrasound sensors). The data received by sensors 18 is processed by controller 12, and the location or coordinates of the object sensed, identified, and/or detected is determined using, in one non-limiting embodiment, a conventional signal processing algorithm within step 48. Various types of signal processing algorithms may be utilized.

Step 50 follows step 48 and, in this step 50, controller 12 compares the location of each sensed object 27 with the current calculated and/or defined "region of interest" 29. If the currently measured and/or positioned coordinates of the identified object 27 are not within the range of coordinates defining the currently defined "region of interest" 29, the attribute data 34 representing that object 27 is discarded, in step 52. If the detected object 27 currently resides within the "region of interest" 29, the data 34 representing that object 27 is further processed by controller 12 within step 54.

Particularly, controller 12, in step 54, acquires and/or identifies certain attributes and characteristics of each sensed object 27 residing in the "region of interest" 29, based upon the respectively received data 34. Examples of such sensed or acquired object attribute data include the size and shape of the object 27, the velocity of the object 27, the direction (if any) that the object 27 is currently traveling, and the temperature of the object 27. Further, controller 12 "translates" or assigns certain mathematical values to this data 34. Controller 12 selectively stores this "translated" data within memory 14.

Step 56 follows step 54 and, in this step 56, a "relevance analysis" is accomplished upon each of the identified objects 27 which are utilized within step 54. Particularly, in one non-limiting embodiment, assembly 10 determines whether each of the objects 27, based upon their respective "translated" data and data values, are relevant or useful to the driver 15 of the vehicle 11. Assembly 10 first "qualifies" each sensed and/or identified object 27 as being "relevant" in the manner described below.

Substantially all data describing the road or highway on which the vehicle is traveling (e.g., the width, path of the road and condition of the road) is deemed to be "relevant" and controller 12 retains this "road" data for further processing. In one non-limiting embodiment, this "road" data is recognized or identified by controller 12 based upon the identity of those sensors 18 which provide this information. That is, certain of the sensors 18 and/or portions of receiver 24 are assigned to monitor only road conditions and attributes. Data originating from these sensors and/or portions of receiver 24, which are received by controller 12, are automatically determined to be within the "region of interest" 29 and are automatically "qualified" as being relevant by controller 12.

All other data 34 is analyzed by assembly 10 (e.g., by controller 12) to determine whether it "matches" or "meets" various predetermined "relevance criteria" values, which are stored within a relevance database or matrix, selectively held and/or stored within memory 14.

In the preferred embodiment, the relevance criteria values represent and/or comprise data values or ranges of values respectively describing and/or defining object size and object location with respect to vehicle 11. The "translated data", for each identified object 27, is first compared with a certain relevance criteria threshold in order to determine if it respectively matches or exceeds these relevance criteria threshold values (e.g., in one non-limiting example, controller 12 uses a "size threshold" to analyze the acquired data). Objects 27 having sensed size or positional values which match or exceed the respective and predetermined "minimal" relevance criteria threshold values are retained or stored within memory 14 for further processing. If the object 27 does not have sensed values which meet at least one (e.g., in another non-limiting embodiment both or all threshold values must be met or exceeded) of these "minimal" relevance criteria threshold values, the data associated with the sensed object 27 is discarded within step 58. If the sensed data associated with each object 27 does respectively meet the "minimal" threshold values, its respective attribute data values are further compared to a predetermined "upper threshold" relevance criteria values (e.g., again corresponding to object size and position). If the respectively sensed object 27 has sensed attribute values which respectively match or exceed at least one of these upper values (e.g., relatively large objects such as a tree, a car, or a wall generally meet or exceed these relevance criteria values), the object 27 is automatically "qualified" as being "relevant" by the assembly 10 and the sensed data relating to that object 27 is retained or stored within memory 14 for further processing. Objects 27 which have a respectively sensed attribute values which are respectively less than the "upper threshold" values, but are greater than "minimal threshold" values (e.g., "potentially relevant objects") are further analyzed based upon their present and potentially future location with respect to the vehicle 11.

Particularly, the location, speed and path of travel of these potentially relevant objects 27 are respectively compared to the current location, speed and path of travel of the vehicle 11. Using conventional statistical, mapping and prediction algorithms, controller 12 determines whether the projected path of the vehicle 11 and the projected and respective path of each of the potentially relevant objects 27 will cause the respective and potentially relevant objects 27 to either intersect or collide with the vehicle 11, or pass within a certain predetermined distance of the vehicle 11 (e.g., within 10 meters or some other programmable and/or modifiable distance). If the controller 12 determines that there will be a likelihood of a collision between a potentially relevant object 27 and the vehicle 11, or that a potentially relevant object 27 will pass within the certain predetermined and programmable distance of the vehicle 11, the respective potentially relevant object 27 is "qualified" as being relevant by assembly 10 and the data relating to the "qualified" object 27 is retained for further processing. Additionally, in the preferred embodiment, assembly 10 will consider an object 27 to be "qualified" if the direction or path of the object 27 is erratic, uncertain, and/or unpredictable by controller 12.

It should be appreciated that pursuant to this "relevance criteria" analysis, substantially all relatively large objects 27 will be "qualified" for display by system 10, and only those smaller objects 27 which meet a minimal threshold relevance criteria requirement and have a potential for collision or a potential for a "near" collision with the vehicle 11 will be "qualified" for display by assembly 10. As such, assembly 10 displays only those objects 27 (e.g., symbols relating to these objects 27) which are relatively "useful" or "relevant" to the vehicle 11 and driver 15. It should further be understood that different types of "relevance criteria" data values or "filters" may be used by assembly 10 to determine whether a particular object 27 is "relevant". For example and without limitation, assembly 10 could determine relevance by the singular use of object size or shape, location or collision potential, or by the selective combination of one or more of these criteria.

In one non-limiting embodiment, substantially all of the sensed data 34 respectively relating to each "qualified" or "relevant" objects 27 is used to match a respective object 27 with a representative icon, as illustrated by step 60. Particularly, in this step 60, controller 12 compares the stored object attribute data values relating to the shape of each respective relevant object 27 with a database table or matrix containing predetermined values or ranges of values representing patterns, dimensions, and/or shapes which are associated with particular objects (e.g., trees, cars, rocks, lane markers, pedestrians, animals, construction barriers, bridges). Each range of values is assigned to and indicative of a particular type of object 27.

In the preferred embodiment of the invention, controller 12 uses a standard "pattern recognition" algorithm which, in one non-limiting embodiment is a conventional algorithm, to compare the dimension and/or shape values of each "qualified" object 27 to those values contained within the database table. If the shape values of a "qualified" object 27 match or fall with the range assigned to a particular object type in the table, the "qualified" object 27 is assigned a display icon which is representative of that type of object (e.g., trees are assigned a "tree-shaped" icon, cars are assigned "car-shaped" icons). If the shape of the qualified or relevant object 27 does not match any of the value ranges held within the table, an "unidentified" icon (e.g., a question mark or some other indicative symbol) is assigned to the object.

Once an icon is assigned to the object 27, controller 12 applies display attributes to the icon which are representative of the object's sensed attributes/characteristics, within step 62. Specifically, controller 12, in one non-limiting embodiment, accesses the retained size, velocity, location, and trajectory data related to the object 27 and dynamically modifies the icon accordingly, in a manner designed and effective to ensure the continued accuracy of the displayed icon or symbol.

For example and without limitation, controller 12 uses a conventional scaling "program" and/or algorithm to selectively increase and/or decrease the size of the displayed icon in order to accurately represent the relative size and range of the object 27 (e.g., controller 12 increases the size of the standard "vehicle" icon for relatively large vehicles, and decrease the size of the standard "vehicle" icon for relatively small automobiles). Thus, the actual size and range of the detected object 27 determines the size of the respective icon displayed by assembly 10. Furthermore, the range of the object 27 determines the location of the icon's placement upon display 20 relative to the vehicle's representative icon (the vehicle 11 is assigned an icon which is disposed generally within the lower center of the display 20). In the preferred embodiment of the invention, controller 12 further assigns different attributes to the selectively displayed icons depending upon the sensed velocity of the identified objects 27. In one non-limiting example, objects 27 moving at a relatively fast velocity are displayed in the color of red, stationary objects 27 are displayed in the color of blue, and relatively slow moving objects 27 are displayed in the color of yellow. As the speed of the objects 27 change, the respective colors of the icons also change (e.g., an object 27 which is initially stationary and then accelerates to move at a high speed has an icon which changes color from blue to red). In another embodiment of the invention, objects 27 having an erratic velocity and/or relatively high collision potential will be displayed as "flashing" or "blinking" icons, in order to effectively warn the driver 15 or passengers of vehicle 11 of a potential hazard.

Once all of the relevant object attributes are acquired, the respective icons are displayed upon display 20. Particularly, the respective icons which are assigned to each of the "qualified" objects 27, along with their respective icon coordinates, are communicated to display 20. Display 20 displays the vehicle 11 (which is assigned an icon), the road upon which the vehicle 11 traverses, and all other "qualified" objects 27 within the "region of interest" 29. In the preferred embodiment of the invention, the assembly 10 (e.g. controller 12) dynamically updates the displayed object icons in "real time", although other intervals of time by be utilized.

That is, qualified objects 27 are identified and displayed in the foregoing manner and objects 27 which are no longer "relevant", are not displayed. Each time that the "region of interest" 29 is altered or recalculated, a new signal describing this region is communicated to display 20 which increases or decreases the size of the icons in order to accommodate all of the relevant icons within the new/modified "region of interest" 29. For example, if the "region of interest" is increased, the controller 12 will decrease the size of the icons on display 20 so that all relevant objects 27 within the "region of interest" 29 will be displayed. In the preferred embodiment of the invention, the user may selectively "zoom-in" or enlarge certain areas of the "region of interest" 29, or expand or contract the "region of interest" 29 by entering associated command data into input device 28.

In the preferred embodiment of the invention, the "region of interest" 29 may be displayed in one of several user selectable informational display formats or views. Particularly, a driver 15 may enter the format of his or her choice by selective use of the data/command input device 28. In the preferred embodiment of the invention, driver 15 or another vehicle occupant may select from a top view format (See FIG. 5), which is a view from above the vehicle 15, a perspective view format (see FIG. 6), which a view from above and behind the vehicle 11, or an isometric view format (see FIG. 7), which is a view from above, behind and either to the left or to the right of the vehicle 11, depending on which side of the road the vehicle 11 is traveling (e.g., if the vehicle 11 travels in the right hand lane, such as in England, the isometric view is "taken" over the right shoulder of the driver 15 toward the center of the road, alternatively, the view is from the left shoulder of the driver 15). Examples of each of these formats are illustrated in FIGS. 5–10.

Figure 7:
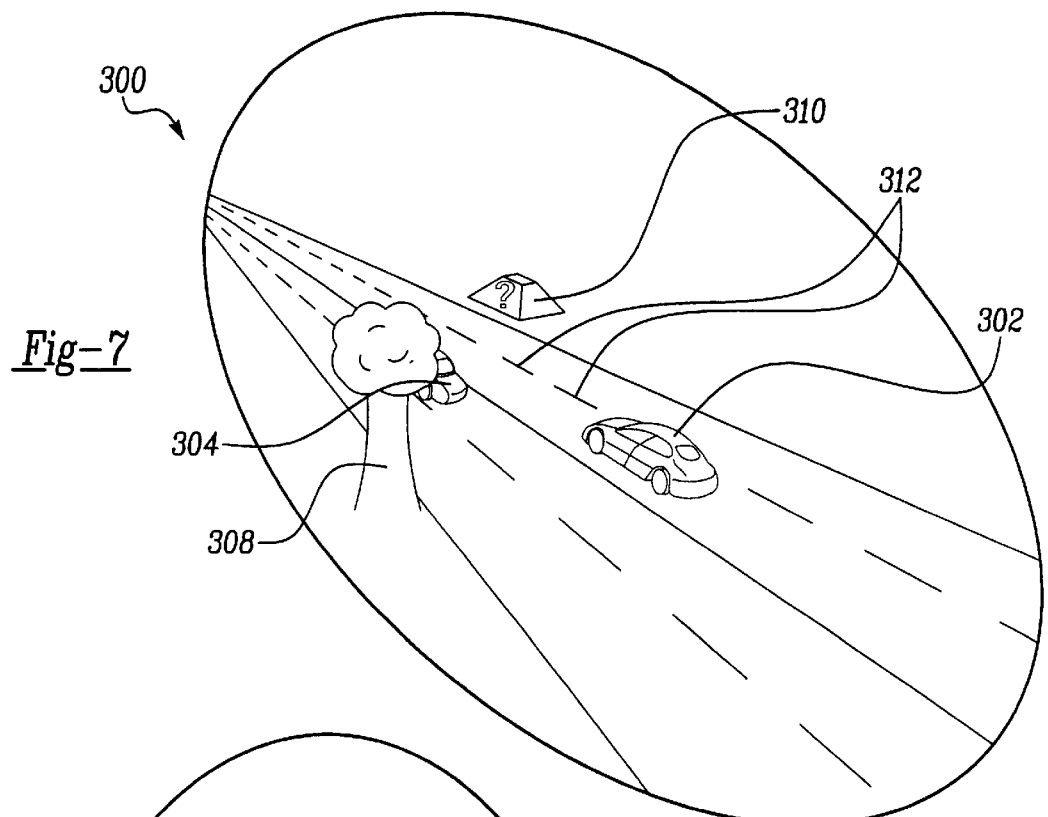
FIG. 7 illustrates a third example of a user interface or a screen which is used by the vehicle information assembly shown in FIG. 1 and further illustrating the selective display of data in an "isometric view" type of informational display format.
Figure 8:
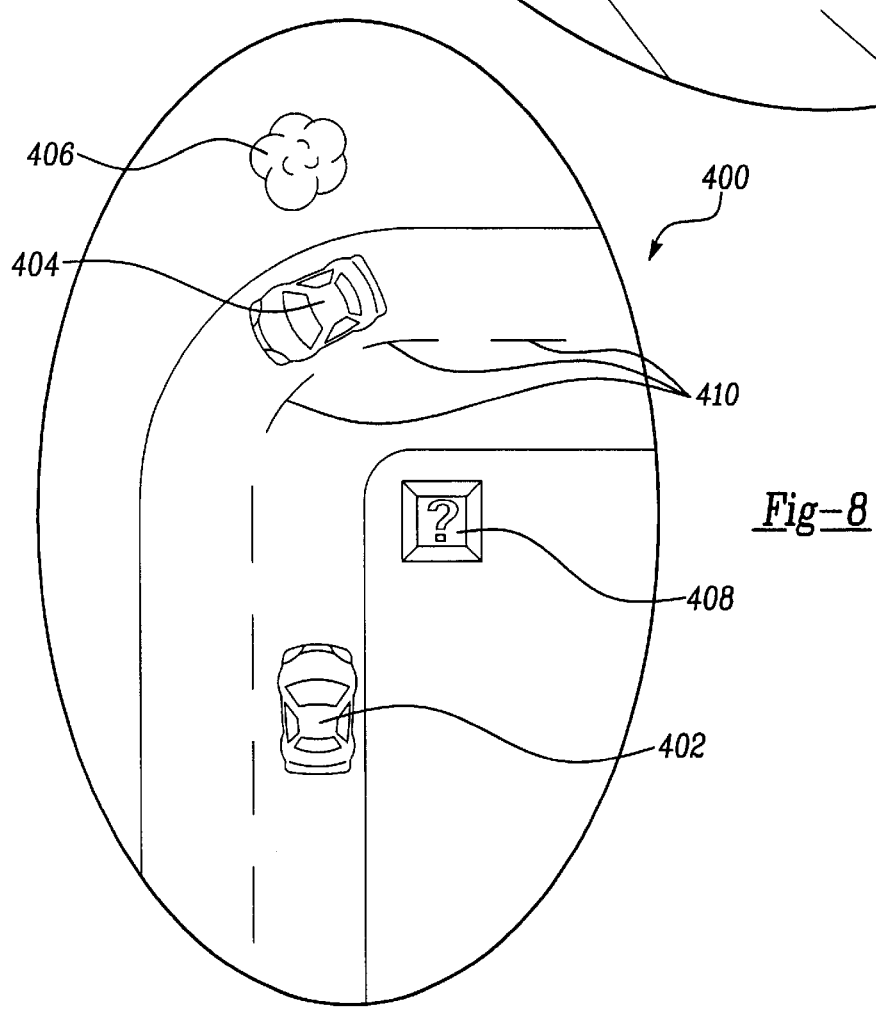
FIG. 8 illustrates a fourth example of a user interface or a screen which is used by the vehicle information assembly shown in FIG. 1 and further illustrating the selective display of data in a "top view" type of informational display format.
Figures 9, 10:
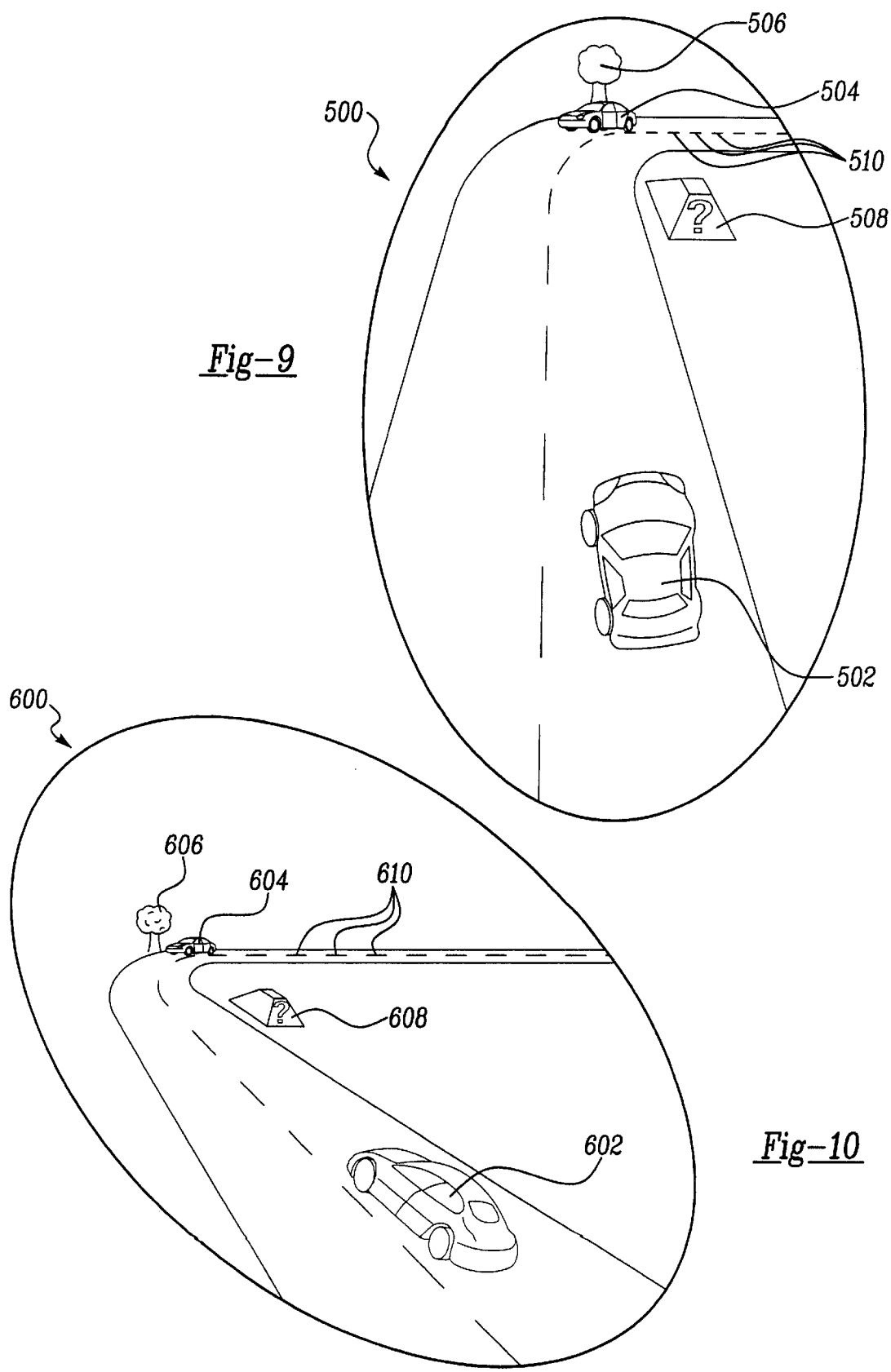
FIG. 9 illustrates a fifth example of a user interface or a screen which is used by the vehicle information assembly shown in FIG. 1 and further illustrating the selective display of data in a "perspective view" type of informational display format.
FIG. 10 illustrates a sixth example of a user interface or a screen which is used by the vehicle information assembly shown in FIG. 1 and further illustrating the selective display of data in an "isometric view" type of informational display format.

Particularly, FIGS. 5 and 8 illustrate two different regions of interest displayed in the top view informational display format (e.g., the display which is shown in FIG. 5 has been dynamically adjusted in accordance with an updated "region of interest" 29, thereby causing the display of FIG. 8 to be presented by assembly 10). In screen 100 of FIG. 5, icon 102 represents the vehicle 11 equipped with system 10. Icons 104, 106 represent other vehicles sensed within the "region of interest". Icon 108 represents a tree, icon 110 represents an unidentified "qualified" or "relevant" object, and icons 112 represent lane markers. Screens 200 and 300, respectively shown in FIGS. 6 and 7, illustrate substantially the same "region of interest" 29 which is shown upon screen 100 but displayed in respective perspective and isometric view display type formats. Icons representing the same objects 27 are defined by the same reference numerals as delineated in screen 100 of FIG. 5 with the exception that in screen 200 the reference numerals are incremented by 100. In screen 300 of FIG. 7 the reference numerals are incremented by 200.

In screen 400 of FIG. 8, icon 402 represents the vehicle 11 equipped with assembly 10, icon 404 represents a vehicle sensed within the "region of interest", icon 406 represents a tree, icon 408 represents an unidentified "qualified" object, and icons 410 represent lane markers. Screens 500 (FIG. 9) and 600 (FIG. 10) illustrate the same "region of interest" 29 shown in screen 400, but displayed in perspective and isometric view informational display type formats, respectively. Icons representing the same objects are defined by the same reference numerals as delineated in screen 400 of FIG. 4 with the exception that in screen 500 the reference numerals are incremented by 100, and in screen 600 the reference numerals are incremented by 200.

It is understood that the various inventions are not limited to the exact construction illustrated and described above, but that these previously delineated inventions may be varied without departing from the scope of the inventions as described in the following claims.

What is claimed is:

1. An assembly for use within a vehicle which is proximate to at least one object said, assembly comprising at least one external environment sensor which senses said at least one object and which provides certain information related to said at least one object; and a processor which is coupled to said at least one external environment sensor, which contains at least one object criteria value, which receives said provided certain information, and which compares said provided certain information to said at least one relevance criteria value and, based upon said comparison, selectively displays at least one icon representing said at least one object.

2. The assembly of claim 1 wherein said certain information includes a location of said at least one object.

3. The assembly of claim 2 wherein said at least one object resides at a first and then a second location, said display assembly further being adapted to display said at least one icon when said at least one object resides at said first location and to modify said at least one icon when said at least one object resides at said second location.

4. The assembly of claim 1 wherein said at least one object has a certain size and wherein said certain information includes said size of said at least one object.

5. The assembly of claim 4 wherein said at least one icon has a certain size which is dependent upon said size of said at least one object.

6. The assembly of claim 1 wherein said at least one object has a certain shape and wherein said certain information includes said certain shape of said at least one object.

7. The assembly of claim 1 wherein said at least one object is moving at a certain velocity and wherein said certain information includes said velocity of said at least one object.

8. The assembly of claim 7 wherein said at least one object is travelling in a certain direction and wherein said certain information includes said direction of travel of said at least one object.

9. The assembly of claim 8 wherein said processor determines whether said at least one object will pass within a predetermined distance of said vehicle and, based upon said determination, to alter the appearance of said displayed at least one icon.

10. The assembly of claim 7 wherein said at least one object travels at a first and then at a second velocity, said assembly being adapted to display said at least one icon in a first color when said at least one object travels at said first velocity and in a second color when said at least one object travels at said second velocity.

11. The assembly of claim 1 further comprising at least two external environment sensors and wherein said processor, by use of said at least two external environment sensors, dynamically configures a region of interest.

12. The assembly of claim 11 wherein said at least one object must be resident within said dynamically configured region of interest in order for said at least one object to be sensed by said at least one sensor.

13. The assembly of claim 11 wherein said vehicle is driven at a certain speed and wherein said region of interest is dynamically configured by use of said vehicle speed.

14. The assembly of claim 1 wherein said at least one external environment sensor comprises an infrared sensor.

15. The assembly of claim 1 wherein said at least one external environment sensor comprises a radar sensor.

16. An assembly for use within a vehicle having at least one attribute, said assembly comprising:
at least one vehicle attribute sensor which senses said at least one attribute and which generates a first value based upon said sensed at least one attribute;
a plurality of external environment sensors which cooperatively sense the presence of certain objects in the vicinity of said vehicle and which cooperatively generate a plurality of second values, each of said plurality of second values representing a unique one of said plurality of said certain objects;
a controller which is communicatively coupled to said at least one vehicle attribute sensor and to said plurality of external environment sensors, said controller containing at least one relevance criteria value, receiving said first value, calculating a region of interest based upon said first value, receiving said plurality of second values, selecting one of said second values by use of said calculated region of interest, comparing said selected one of said second values to said at last one relevance criteria value and, based upon said comparison, selectively generating at least one output signal; and
a display which is communicatively coupled to said controller, which receives said at least one output signal, and which selectively displays at least one icon representing one of said plurality of certain objects which is located within said region of interest and which is uniquely associated with said selected one of said second values.

17. The assembly of claim 16 wherein said at least one vehicle attribute comprises the speed of the vehicle.

18. The assembly of claim 16 wherein said plurality of said external sensors includes a microwave sensor.

19. The assembly of claim 16 wherein said plurality of said external sensors includes an infrared sensor.

20. A method for use within a vehicle having a certain speed and direct of travel, the method being effective to display information related to an object, said method comprising the steps of:
providing at least one vehicle attribute sensor which measures said speed and direction of travel of said vehicle;
providing at least one external environment sensor;
providing a controller which utilizes said at least one external environment sensor to selectively and dynamically create a region of interest based upon said measured speed and the direction of travel of said vehicle;

providing a second external environment sensor for measuring a location of the object;

providing a third external environment sensor for measuring a size of the object;

determining whether the object resides within the region of interest; and creating and displaying an icon only if the object resides within the region of interest.

\* \* \* \* \*